United States Patent Office 3,020,129
Patented Feb. 6, 1962

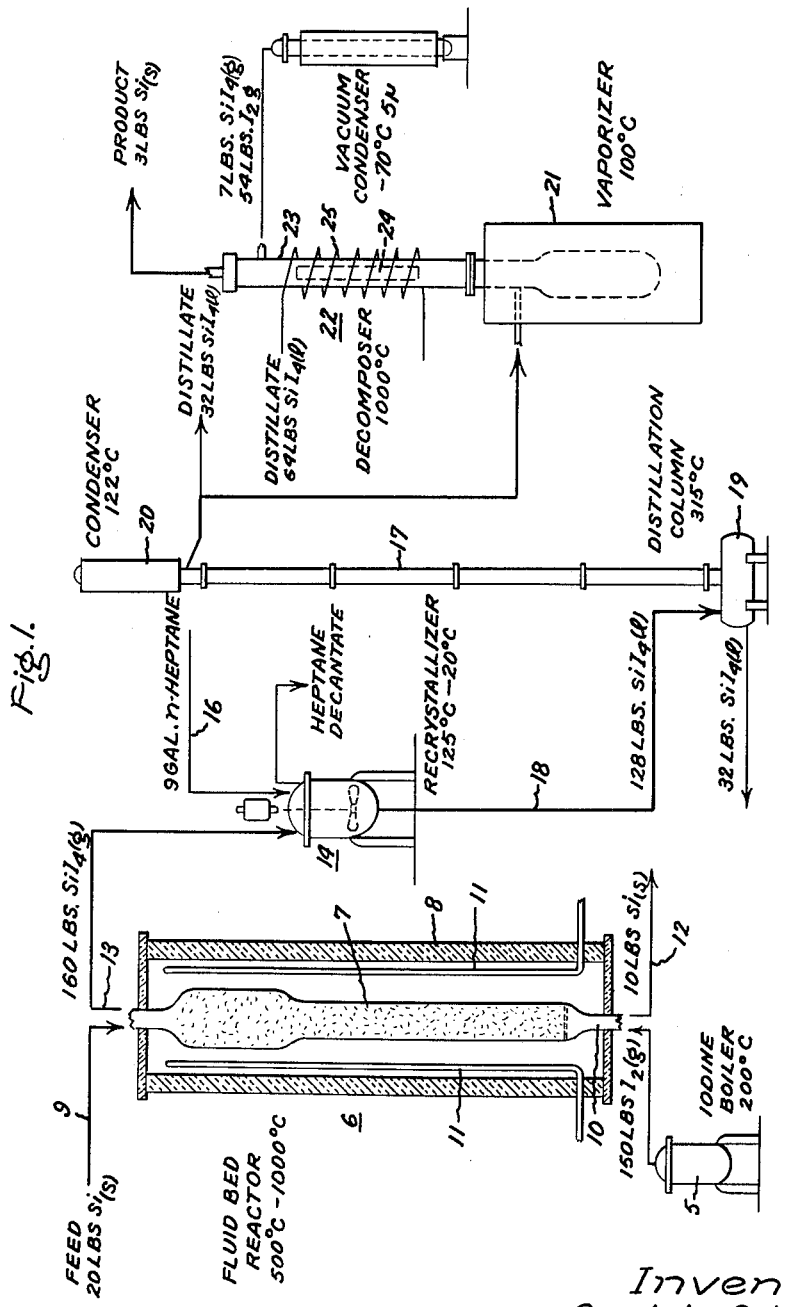

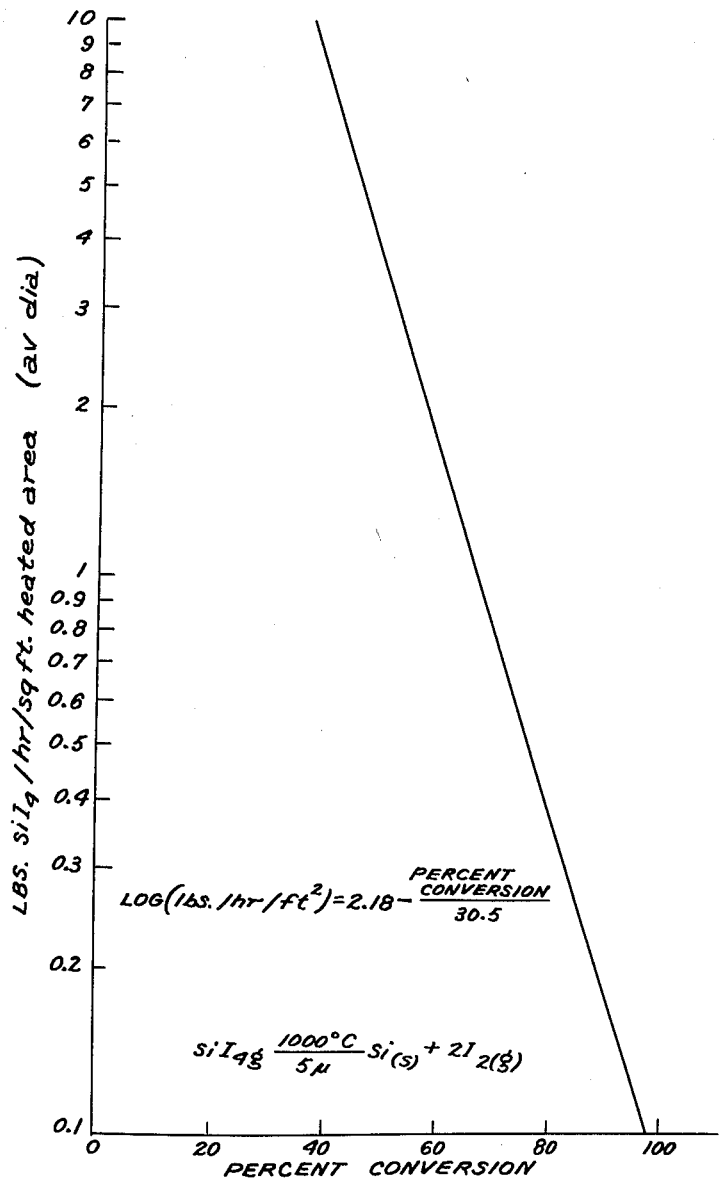

3,020,129
PRODUCTION OF SILICON OF
IMPROVED PURITY
Carlyle S. Herrick, Alplaus, N.Y., assignor to General
Electric Company, a corporation of New York
Filed July 25, 1958, Ser. No. 751,088
3 Claims. (Cl. 23—223.5)

This invention relates generally to the production of elemental silicon and more particularly to an improved process for producing increasingly pure semiconductor quality silicon.

Several methods have been employed for producing high purity silicon, the most notable of these being a method of reducing silicon tetrachloride vapor in the presence of zinc to form elemental silicon, and another whereby impure silicon is converted to tetraiodide, distilled, and then decomposed to purer silicon. This invention is more particularly directed to the latter of the above-mentioned methods, which is more fully set forth and claimed in a copending application, Serial No. 518,404 filed June 27, 1955, now abandoned, and assigned to the same assignee as the present invention. In the aforementioned application, there is disclosed a process of producing semiconductor silicon by preparing silicon tetraiodide from elemental silicon, recrystallizing the silicon tetraiodide, and decomposing the resulting purified tetraiodide. A more complete description of the process disclosed in the aforementioned application is one example therefrom, as follows. Silicon tetraiodide was prepared from reagent grade iodine and silicon having a purity of about 99.8%. Approximately 2267 grams of iodine were placed in a reaction vessel and heated to a temperature of about 180° C. to vaporize the iodine. The reaction vessel is connected to a column containing 122 grams of powdered silicon maintained at a temperature of about 600° C. The column is connected to a condenser maintained at room temperature and the entire system was slowly purged with nitrogen. As the iodine passed through the column of silicon, silicon tetraiodide was formed, and at the end of the reaction, 2385 grams of silicon tetraiodide were prepared. This silicon tetraiodide was dissolved in 663 cc. n-heptane which was refluxed at a temperature of about 115° C. during the solution step. The solution was then cooled to room temperature and after the tetraiodide had crystallized from the solution, the solvent was decanted. Fresh n-heptane in a molar amount equal to the number of moles of silicon tetraiodide was then added to the crystals. This mixture was then heated at reflux until the tetraiodide redissolved, the solution was again cooled to room temperature and the silicon tetraiodide allowed to crystallize out. After recrystallization had taken place, excess n-heptane was decanted and the crystals which were moistened with n-heptane were subjected to a vacuum until all of the solvent had evaporated. The resulting dried crystals were then distilled in a 12-plate quartz column at atmospheric pressure at a temperature of about 295° C. A middle cut from this distillation consisting of 1073 grams silicon tetraiodide was decomposed as follows. The material was placed in a vessel connected to a column containing a quartz tube which was heated to a temperature of about 1000° C. and maintained under a vacuum of about 3 millimeters of Hg. The vessel containing the silicon tetraiodide was then heated to a temperature of about 100° C. to volatilize the silicon tetraiodide. As the silicon tetraiodide came into contact with the quartz tube it decomposed, depositing the silicon on the tube, with the iodine from the decomposition being collected in a suitable receiver. After all of the tetraiodide had been decomposed, the silicon was removed from the quartz tube, melted and formed into a single crystal. This single crystal was an N-type semiconductor having a resistivity of about 160 ohm centimeters with a lifetime of the minority carriers being about 2250 microseconds. The single crystal is further characterized by containing about 0.4 electrically active impurity atoms per billion atoms of silicon.

While the above-mentioned process produces a satisfactory yield of silicon with high purity, the continued widespread use and application of silicon in semiconductor and related devices, and the increased interest in this material, particularly in its purest form, presents a need not only for more silicon but also for more and higher purity silicon.

Accordingly, it is an object of this invention to provide an improved process for producing silicon.

It is another object of this invention to provide an improved process for a greater yield of silicon.

It is a further object of this invention to provide a fluidizing reaction bed in the production of silicon tetraiodide.

It is a still further object of this invention to increase the purity of silicon in the decomposition step of the silicon-making process.

Briefly described, this invention in one form is an improvement in the well known silicon production process, that of reaction, recrystallization, distillation and decomposition of silicon tetraiodide, of employing a fluidized bed where the silicon and iodine are brought together to form silicon tetraiodide, while at the same time providing a novel surface material for the decomposition of silicon tetraiodide in purer form.

This invention will be better understood when taken in connection with the following description and the drawing, in which:

FIG. 1 is a combined schematic illustration and flow sheet of the method and apparatus utilized to carry out this invention.

FIG. 2 is a curve indicating the performance of this invention in percent conversion of $Si_4$ in the decomposer.

The apparatus as illustrated in FIG. 1 is also employed to carry out, in general, the same sequence of events as described in the example of the aforementioned application, particularly reaction, recrystallization, distillation, and decomposition of silicon tetraiodide. The important improvements of this invention relate to the replacement of the stationary bed reactor for the formation of silicon tetraiodide by a fluid bed reactor, together with new decomposer material surfaces. The important features of this invention are better described in context with the entire apparatus.

In connection with the description of the apparatus, it is to be understood that the flow sheet portion of FIG. 1 represents one working example of the process and the description of the particular parts of the apparatus as to sizes, proportions, and materials of construction, etc., are to be taken as one preferred form of the invention, especially since other sizes, proportions and materials may serve equally well and be within the scope of the invention. However, with respect to the important features of the fluid bed reactor and the materials employed in the decomposer, the description thereof will be set forth with more particularity.

Obtaining suitable materials of construction for the apparatus of this process presented a difficult problem in that at temperatures above the melting point, silicon tetraiodide becomes aggressive toward container materials and behaves as a general solvent. Because it is the least reactive with tetraiodide, quartz was selected for the fluid bed reactor, the distillation column, but only in part for the decomposer as will be described. Pyrex was found suitable for the recrystallizer.

The description of the process and apparatus commences with the iodine boiler 5, a 10-gallon glass lined steel vessel. Oil heated to approximately 230° is pumped through a conventional heat exchanger jacket about the boiler to vaporize the iodine.

The first feature of this invention is the fluid bed reactor 6 where silicon and iodine vapor from the boiler 5 are brought together to form silicon tetraiodide. In the exemplary form of this invention as illustrated in FIG. 1, the fluid bed 6 includes a quartz tube 7 which is 4 inches in diameter and 8 feet long, supported in a vertical electrical furnace 8. Commercial silicon powder, in sizes between 44 microns and 100 microns diameter, is admitted into the vertical quartz tube 7, through conduit 9 while iodine vapor enters at the inlet 10 with a velocity sufficient to give a substantial buoyant force to each particle in the bed. Electric furnace elements 11 connected to a suitable source of power, not shown, are of the exposed type to provide maximum controllabiilty, while the heat of reaction is removed from the silicon powder by direct radiation of the furnace walls which are maintained 50° C. cooler than the reaction temperature. Solid silicon is removed from tube 7 through conduit 12 and silicon tetraiodide through conduit 13. In the fluidized condition, the bed expands in height, individual particles find some freedom to move with respect to their neighbors, and the overall appearance resembles a boiling liquid. Fluidizing provides excellent heat transfer between particles and the vessel wall. One of the advantages is that the exothermic reaction can take place at a constant temperature instead of, as in a fixed bed, in a travelling hot spot with very wide temperature fluctuations. The constant temperature also means constant reactivity for silicon and its impurities and a better separation between them based on reaction energies. Iodine residence time in the bed is short, but the reaction is rapid and the yield is quantitative. As iodine is consumed from the vapor stream, the tetraiodide vapor formed continues to fluidize the bed. Unreacted silicon, enriched in impurity, is discharged at the end of the experiment.

Not only is all iodine vapor consumed, but the initial volume of iodine vapor is approximately two times the quantity of tetraiodide produced. Also, the iodine vapor velocity entering at the bottom of the bed is twice the velocity of the tetraiodide at the exit end. The high velocity and large volume of iodine vapor at the bottom of the fluidized bed improve the heat transfer, separability of impurities and constancy of temperature, while the reduced velocity and volume of silicon tetraiodide at the top of the fluidized bed tend to reduce entrainment of solid silicon out of the bed.

A substantial purification of silicon is obtained from the fluidizing process; the overall improvement of providing silicon tetraiodide by fluidizing with iodine vapor and then decomposing the silicon tetraiodide reduces the impurity level or content by a factor of approximately a thousand.

From the fluid bed reactor 6, the silicon tetraiodide vapor proceeds to the recrystallizer 14, which, in the exemplary form of this invention, is a 20-gallon vessel of glass lined steel. A jacket form of heat exchanger surrounds the vessel for steam heating or water cooling. The conduit 13 connecting the fluid bed reactor 6 to the recrystallizer 14 and through which the iodide vapor enters is heated and insulated quartz piping. A vent line 16 connects the recrystallizer to a heptane condenser and receiver. For convenience, the recrystallizer 14 may be mounted on a base which permits weighing without disturbing the quartz piping. Silicon tetraiodide vapor condenses in the recrystallizer 14, research grade n-heptane is added, and the resultant slurry warmed and then cooled to recrystallize the tetraiodide. The heptane containing dissolved impurities is decanted, and the operation then repeated. The overall yield for two recrystallizations is about 80%.

From the recrystallizer 14, the silicon tetraiodide in liquid form proceeds to the distillation column 17 through conduit 18 where it is charged to a 10-gallon quartz reboiler 19 at the bottom of the distillation column 17. Heat is supplied by Calrod units inserted in quartz tubes sealed lengthwise in the lower part of the reboiler. Excellent heat transfer and minimum superheating result from this arrangement. The column 17 comprises generally 4 lengths or sections of 3-inch diameter quartz tubing each 4½ feet long. At the top of the distillation column, a three foot length of 4-inch diameter quartz tubing serves as the condenser 20, the condenser 20 being surrounded by a heat exchange jacket of 6-inch stainless steel tubing connected to a circulating oil coolant system, not shown. The distillation column 17 divide the tetraiodide into a bottom fraction containing the less volatile impurities, a first distillate containing the more volatile impurities, and a second distillate of purified tetraiodide which is 50% of the column charge.

Some consideration should be given the impurity distribution in the reboiler 19 by means of the iodide vapor pressures. Vapor pressures of most metal iodides are lower than for silicon, so they will remain in the reboiler. Phosphorus and boron are more volatile and must be removed at the top of the column before pure silicon tetraiodide can be distilled overhead. At one atmosphere carbon tetraiodide boils 19° higher than silicon tetraiodide and phosphorus triiodide 63° lower. For silicon the relative volatility is 1.4 with respect to carbon. For phosphorus the relative volatility is 3.4 with respect to silicon. Both volatilities are sufficient to permit large separations with a moderate number of theoretical plates in the distillation column.

Purified tetraiodide from the distillation column 17 is passed to the vaporizer 21 where evacuation and gentle warming produces a low pressure tetraiodide atmosphere in the decomposer 22. The decomposer 22 includes a 2-inch diameter quartz tube 23 within which there is provided a heated surface 24 upon which the decomposition of silicon tetraiodide takes place to form silicon. Surface 24, in the preferred form of this invention, is heated by means of an induction coil 25, connected to a source of power, not shown, although other forms of heating may be employed.

FIG. 2 is a curve showing the decomposition reaction where the percentage of silicon tetraiodide decomposed or conversion is related to the silicon tetraiodide passed through the decomposer per hour per square foot of silicon surface heated to a reaction temperature.

A further feature of this invention relates to the particular material of the heated surface or surface element 24 with respect to obtaining silicon of very high purity from the preferred material.

It has been found that extremely high purity silicon is obtained from the teachings of this invention when the heated surface 24 is also of substantially pure silicon. For example, in one form of this invention, the decomposer is a 2-inch diameter quartz tube with a silicon rod or cylinder 14 inches long and ⅝ inch in diameter positioned therein as the decomposing surface. Rod temperature is maintained at approximately 1,000° C. by external electrical coil 25 connected to an induction heater. Adjustment of coil 25 along the rod permits proper temperature distribution. Silicon tetraiodide decomposes on contact with the heated silicon surface 24 and silicon deposits on the rod which then increases in diameter. The silicon surface employed in this exemplary process is Du Pont hyperpure silicon which is zone refined to 100–200 ohm centimeter resistivity. It is to be understood, however, that good results are obtained by the teachings of this invention in a manner not dependent on the purity of the silicon in the decomposer, but that the purer the decomposition surface, the purer the final silicon. The decomposition surface, in this respect, includes the sub-surface since diffusion is active under these conditions.

In the overall stoichiometry of the process, 20 pounds of silicon powder is fed to the reactor for each 3 pound deposit of product silicon. The actual amount of waste is generally smaller than is indicated since all the impure streams may be recovered and reused.

An exemplary deposit obtained by employing the teachings of this invention together with the indicated flow diagram of FIG. 1 and utilizing in the decomposer a 14 inch length of rod 5/8 inch in diameter contained in excess of one pound of new silicon. It is to be understood, however, that the deposit that may be larger dependent upon the operation of the system. The new silicon structure consists of close packed crystals with major axes radiating outward from the center. By way of comparison, the impurity level on a quartz decomposing surface is in the range of parts per million, and for silicon, in the range of parts per billion.

Resistivity measures the number of charge carriers. Usually it varies at different positons with a single crystal. The variance is caused by the rejection of impurities as the lattice forms during crystal growth, and by the addition to the liquid of new impurities from the slowly dissolving quartz crucible. The resistivity for the silicon of this invention had the greatest value occurring at the beginning of the crystal, which exceeded 3,000 ohm-centimeters uncompensated. Sections removed from the interior of some crystals gave resistivity values of 10,000 and 13,000 ohm-centimeters.

Information on the effectiveness of different process steps was obtained on the basis of an impurity concentration in the starting silicon of 1 part in a thousand. Spectrographic analysis showed the concentration of impurities in tetraiodide to be less than 1 part per million after the reaction step and less than 1 part per 10 million after the recrystallization step. Lesser amounts of impurities are not directly detectable, but experience with distillation indicates a maximum separation factor of about 10,000 for this step. No purification of tetraiodide is to be expected in the decomposition step. Hence, the process information indicates that impurity levels of $10^{-11}$ or 1 part in 100 billion are reasonable.

It can thus be understood that this invention provides a substantially improved process for the production of high purity silicon on the order of 3,000–13,000 ohm-centimeter resistivity or approximately 2 to $9 \times 10^{-11}$ atoms impurity per atom of silicon, a purity not heretofore obtainable directly from a process of producing silicon.

It is to be further understood that where the cylindrical form of silicon is desired, the decomposing surface may be of a hollow cylinder configuration. In this respect, since the process of this invention provides silicon of extreme purity, other materials may be employed as the decomposing surface. The material, however, should be substantially inert with respect to silicon and of good purity. Particular materials for satisfactory results include quartz and tantalum in various forms including tubular.

As will be apparent to those skilled in the art, the objects of this invention are attained by the use of a fluid bed reaction in the formation of silicon tetraiodide and a decomposing surface of high purity silicon.

While other modifications of this invention and variations that may be employed within the scope of the invention have not been described, the invention is intended to include all such as may be embraced within the following claims.

What I claim as new and desire to secure by Letters Patent of the United States is:

1. In a process of converting low grade silicon into silicon of improved purity, the improvement of providing high purity silicon which comprises, fluidizing silicon in particle form with iodine vapor to form silicon tetraiodide, said fluidizing including feeding silicon powder into a furnace, introducing iodine vapor into said furnace, removing excess heat of reaction from the fluidized particles, recrystallizing the silicon tetraiodide, distilling the silicon tetraiodide, and thereafter converting the silicon tetraiodide to elemental silicon by thermal decomposition thereof on a heated silicon surface.

2. In a process of converting low grade silicon into silicon of improved purity, a method of providing high purity silicon tetraiodide which comprises, fluidizing silicon in particle form with iodine vapor to form silicon tetraiodide, said fluidizing including feeding silicon powder into a furnace, introducing iodine vapor into said furnace, maintaining the velocity of the iodine vapor entering the furnace approximately twice of that of the iodide vapor leaving the furnace, removing excess heat of reaction from the fluidized particles, passing the silicon tetraiodide to a recrystallizer, recrystallizing said silicon tetraiodide, said recrystallizing including adding a solvent to the condensed silicon tetraiodide, warming said silicon tetraiodide and then cooling said silicon tetraiodide for recrystallization, decanting the solvent containing dissolved impurities, passing the recrystallized silicon tetraiodide to a distiller, and distilling the silicon tetraiodide.

3. The invention as described in claim 2 wherein the silicon tetraiodide from said distiller to be used for converting to elemental silicon is a second distillate of purified tetraiodide which is approximately 50% of the distillate charge.

References Cited in the file of this patent

UNITED STATES PATENTS

| | | |
|---|---|---|
| 2,425,504 | Belchetz | Aug. 12, 1947 |
| 2,843,458 | Beattie et al. | July 15, 1958 |
| 2,854,318 | Rummel | Sept. 30, 1958 |

FOREIGN PATENTS

| | | |
|---|---|---|
| 787,043 | Great Britain | Nov. 27, 1957 |

OTHER REFERENCES

Kalbach: Article in "Chemical Engineering," January 1947, pages 105–108.

"Chemical Engineering," August 1957, pp. 164–165.

Litton et al.: "Journal of the Electrochemical Society," vol. 101, No. 6 (1954), pages 287–291.

Rubin et al.: "American Chemical Society Journal," vol. 78 (1956), page 880.